May 29, 1956 M. E. PETERSON 2,747,708
AUTOMATIC TWO-SPEED GEARING FOR BICYCLES
Filed Feb. 14, 1955 2 Sheets-Sheet 1

WITNESS:
Esther M. Stockton

INVENTOR.
Merle E. Peterson
BY
Clinton L. James
ATTORNEY

May 29, 1956 M. E. PETERSON 2,747,708
AUTOMATIC TWO-SPEED GEARING FOR BICYCLES
Filed Feb. 14, 1955 2 Sheets-Sheet 2
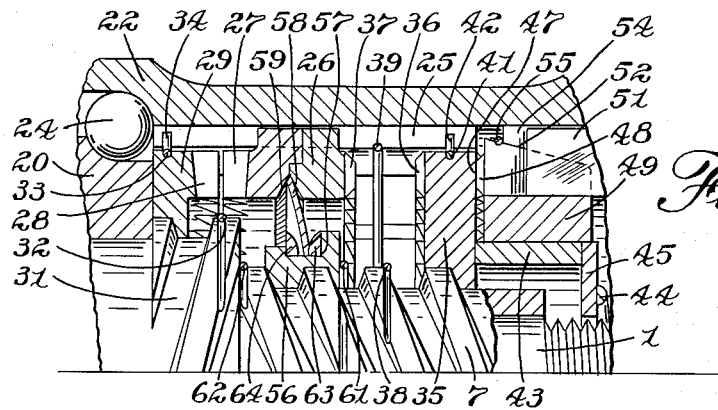
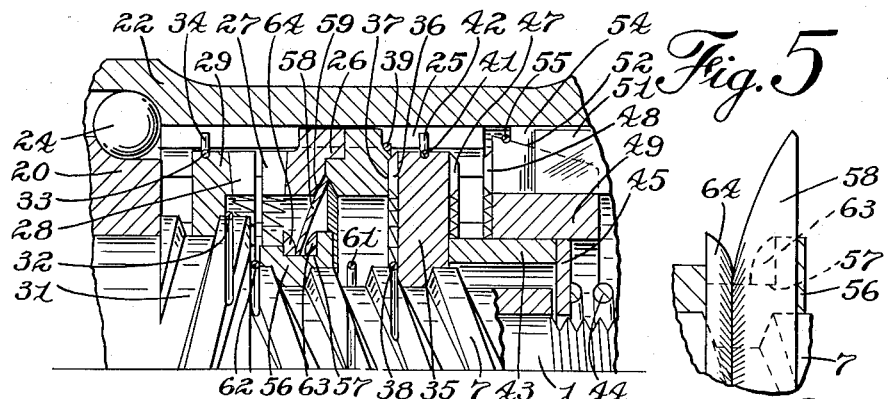
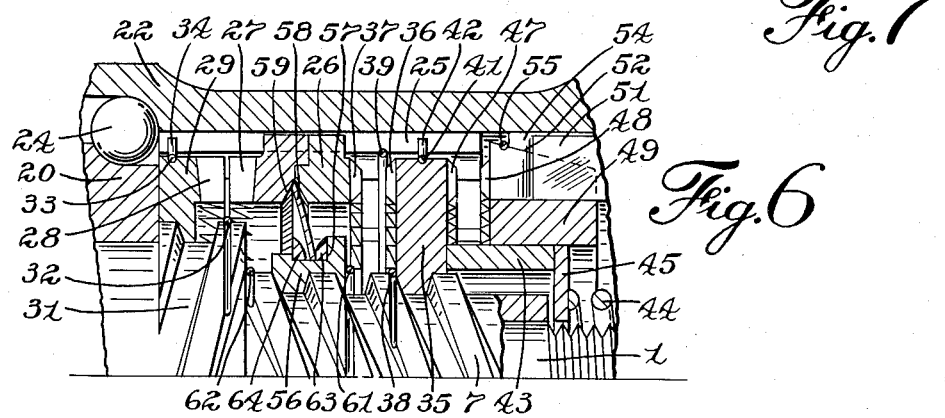
INVENTOR.
Merle E. Peterson United States Patent Office 2,747,708
Patented May 29, 1956

2,747,708
AUTOMATIC TWO-SPEED GEARING FOR BICYCLES

Merle E. Peterson, Elmira, N. Y., assignor to Bendix Aviation Corporation, a corporation of Delaware Application February 14, 1955, Serial No. 487,766

8 Claims. (Cl. 192—6)

The present invention relates to automatic two-speed gearing for bicycles, and particularly to a transmission which shifts down from high gear when a predetermined load is exceeded, and which shifts back up into high gear responsive to coasting.

It is an object of the present invention to provide a novel transmission of this type in which the shift from one gear ratio to the other takes place in a rapid, positive manner, precluding the possibility of a neutral, disconnected condition.

It is another object to provide such a device in which the shift from high gear to low gear involves only a very small amount of relative rotation of the loaded transmission elements, so that the angular position of the pedals will not change significantly during the shifting operation.

It is another object to provide such a device in which, when the transmission is in low gear, there is no tendency to shift back up into high gear, irrespective of fluctuations in the torque transmitted, until the operator causes coasting and/or back pedalling to occur.

It is another object to provide such a device incorporating means for preventing premature engagement of the brake actuating elements while insuring prompt and positive application of the brake responsive to back pedalling.

It is another object to provide such a device in which the torque transmitting parts are of sturdy construction, capable of withstanding severe shock loads.

It is another object to provide such a device which is easy to take apart and assemble correctly without special tools or complicated adjustment procedure.

Further objects and advantages will be apparent from the following description taken in connection with the accompanying drawing in which:

Fig. 4 is a view similar to Fig. 3 showing the parts in braking position;

Fig. 5 is a similar view showing the parts in low speed driving position;

Fig. 6 is a similar view showing the parts in the positions assumed while coasting; and Fig. 7 is a fragmentary detail, on a further enlarged scale, showing the shifting spring annulus seated on the control nut in the low gear position.

Figure 1:
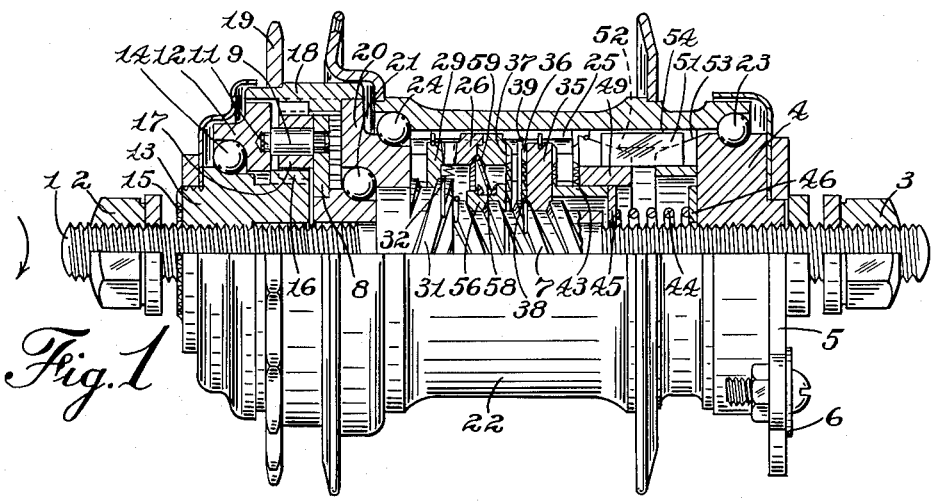
Fig. 1 is a side elevation, partly broken away and in section, of a preferred embodiment of the invention showing the parts in the positions assumed when the device is operating in high gear.

In Fig. 1 of the drawing there is illustrated a fixed axle 1 arranged to be clamped in the rear fork of a bicycle or the like, not illustrated, by means of clamp nuts 2 and 3. A brake expander and anchor member 4 is adjustably mounted on the axle 1 and prevented from rotation by means of a torque arm 5 non-rotatably mounted thereon and connected at its free end by means of a clip 6 to the frame of the bicycle.

A low speed driving screw shaft 7 is journalled on the axle 1 and has fixedly mounted thereon in any suitable manner a planet carrier disc 8 in which a circular series of planet bearing pins 9 are fixedly mounted at one end. The opposite ends 11 of the bearing pins 9 are seated in a race member 12 which is rotatably mounted by means of ball bearings 14 on a cone bearing member 13 threaded on the axle 1.

Figure 2:
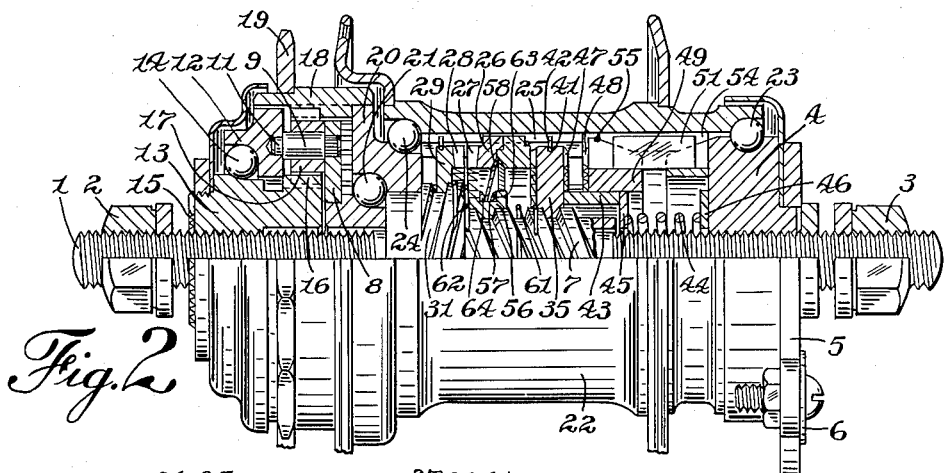
Fig. 2 is a similar view showing the device operating in low gear.

Cone member 13 is provided on its outer end with dentals 15 adapted to engage the fork of the bicycle and be non-rotatably connected thereto by means of the clamp nut 2. This cone member also comprises a sun gear portion 16 adapted to engage a plurality of planet pinions 17 rotatably mounted on the pins 9. The planets also engage in an internal ring gear 18 of a high speed driving member 20 which is driven by a sprocket 19 and which is rotatably mounted on the low speed screw shaft 7 by means of bearings 21. A wheel hub 22 is rotatably mounted at one end on the anchor member 4 by means of bearings 23, and at its other end on the high speed driving member 20 by means of bearings 24. The interior of the hub is splined for a portion of its length as indicated at 25 and a driven clutch member 26 is slidably but non-rotatably mounted in said splined portion. The driven clutch member is provided with inclined teeth 27 adapted to cooperate with similar teeth 28 (Fig. 2) on a high speed driving clutch member 29 threaded on a high speed screw shaft 31 rigidly connected to the driving member 20.

In the device as illustrated, forward rotation of the hub is in the direction of the arrow in Fig. 1, that is to say in a clockwise direction looking from the left in Fig. 1. The high speed screw shaft 31 is formed with a left hand thread, whereby driving torque transmitted thereby to the clutch member 29 will move the clutch member to the right, toward engagement with the driven clutch member 26. Such movement of the driving high speed clutch member is limited by a stop ring 32. A spring ring 33 (Fig. 3) is frictionally mounted in a groove in the periphery of the high speed driving member 29 and has a terminal portion 34 bent radially outward to engage between the splines in the hub 22 whereby when the hub overruns said clutch member, the latter is threaded back on the screw shaft 31 out of operating position as shown in Fig. 4.

The low speed screw shaft 7 is provided with a right hand thread, and a low speed driving clutch member 35 is threaded thereon and provided with teeth 36 adapted to engage similar teeth 37 on the driven clutch member 26. Movement of the low speed driving clutch member 35 to the left on the screw shaft 7 is limited by a stop ring 38, seated on the screw shaft 7, and movement of the driven clutch member 26 to the right is similarly limited by a stop ring 39 seated in the interior of the hub.

A spring drag ring 41 is frictionally mounted in a groove in the periphery in the low speed driving clutch member 35 and is formed with an outturned end 42 engaging in the splines of the hub 22 whereby when the hub overruns the low speed driving shaft 7, the low speed driving clutch member 35 tends to be moved to the right on the screw shaft. Such movement however is resisted by a sleeve member 43 which bears frictionally against the side of the low speed driving clutch member 35 by virtue of the pressure of a spring member 44 exerted through a thrust ring 45. Spring 44 bears against the anchor member 4 through the intermediary of a thrust washer 46.

The low speed driving clutch member 35 is also provided with dentals 47 adapted to engage similar dentals 48 on a brake expander member 49 which is slidably but non-rotatably connected to the anchor member 4 by means of rectangular keys 51. Expander member 49 is provided with a conical surface 52 cooperating with a conical surface 53 on the anchor member to expand semi-cylindrical brake shoes 54 into frictional engagement with the interior of the hub 22 when the expander 49 is forced to the right by the low speed driving clutch member 35 responsive to backward rotation of the screw shaft 7. Rotation of the brake shoes 54 is prevented by said rectangular keys 51. Said keys are confined between the anchor member 4 and expander 49 by means of a stop ring 55 mounted on the latter.

Means for controlling the shifting movement of the driven clutch member 26 in the hub 22 is provided comprising a control nut 56 threaded on the screw shaft 7 and having a peripheral groove 57 forming a seat for a flexible dished spring annulus 58 the periphery of which is received in a groove 59 formed in the interior of the driven clutch member 26. Travel of the control nut 56 on the screw shaft 7 is limited by the stop rings 61, 62 located on said screw shaft on the right and the left of the control nut respectively. The groove 57 is preferably lined on its right hand side with a ring 63 of suitable bearing material such as nylon. The left hand side of said groove is also provided with a wear ring 64 which may be of any suitable wear resistant material and may if desired be knurled on its engaging surface. The annulus 58 may also be correspondingly knurled, as well as on its outer periphery if deemed desirable.

Figure 3:
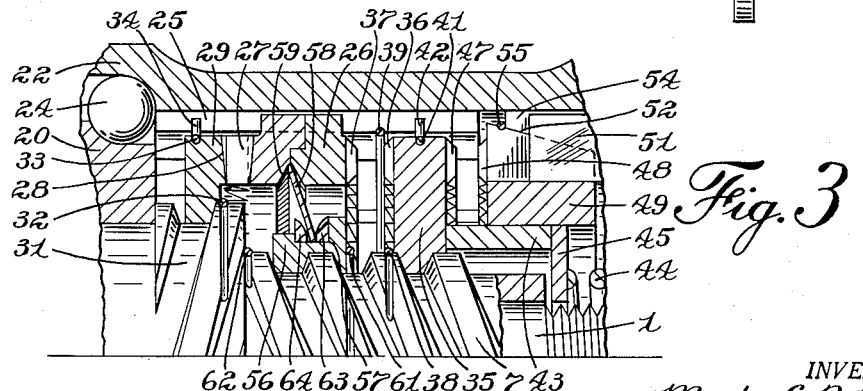
Fig. 3 is an enlarged detail, partially in section, showing the clutching and braking mechanism in high gear operating position.

In operation, starting with the parts in the positions illustrated in Figs. 1 and 3, rotation of the high speed driving member 20 by the sprocket 19 causes the screw shaft 31 to rotate the high speed driving clutch member 29 while holding it against its stop ring 32. Since the driven clutch member 26 is at this time held in its high speed position by the spring annulus 58, this rotation is transmitted through the inclined teeth 28, 27 to rotate the hub 22 at the same speed as the driving member 20.

In view of the fact that the high speed driving clutch teeth 27, 28 are inclined with respect to the axis of the hub, the torque transmitted therethrough tends to cam them apart, and when a predetermined torque is exceeded, this camming action moves the driven clutch member 26 to the right against the action of the spring annulus 58 until the latter passes over its dead center position and snaps to the right as shown in Fig. 5, this action being analogous to that of the so called "cricket" diaphragm. When this happens, the dentals 37 of the driven clutch member engage the corresponding dentals 36 of the low speed driving clutch member 35, and the hub 22 is rotated at reduced speed by torque transmitted through the planetary gearing to the low speed screw shaft 7. At this time, the low speed driving clutch member 35 is held against its stop ring 38, as shown in Fig. 5, by the screw-jack action of the screw shaft 7. The dentals 36, 37 of the low speed clutch are preferably of saw-tooth shape as illustrated so that there is little or no tendency for them to cam apart during low speed driving operation.

In order to shift back into high gear it is merely necessary for the operator to stop pedalling for an instant, thus allowing the hub 22 to coast or overrun the then stationary screw shafts. When this occurs, rotation of the hub is transmitted frictionally from the driving clutch member 26 through the annulus 58 to the control nut 56, causing it to travel to the right from its position in Fig. 5 to its position in Fig. 6. This snaps the annulus 58 over to its high speed position, correspondingly shifting the driven clutch member to the left as shown in Fig. 6 where it is in position to be engaged by the high speed driving clutch member 29 upon resumption of pedalling by the operator. As previously mentioned, and as best shown in Figs. 5 and 7, those surfaces of the spring annulus 58 and of the grooves 57 and 59, which are in engagement when the device is in low gear, may be knurled to ensure the transmission of torque through the annulus to the control nut 56 to accomplish the shift to high gear.

When it is desired to apply the brake whether in high gear or low gear, it is merely necessary for the operator to back pedal slightly, whereupon the low speed driving clutch member 35 is moved to the right by the screw-jack action of screw shaft 7, such movement being assured by the combined frictional retarding effect of the drag ring 41 and the sleeve 43. The force of the spring 44 is thus overcome, and the dentals 47, 48 of the low speed driving clutch member 35 and expander member 49 brought into engagement. The expander 49 is then forced to the right by the further screw-jack action of the screw shaft 7 to apply the brake with a force depending upon the back pedalling pressure exerted by the operator.

Although one form of the invention has been shown and described in detail it will be understood that changes may be made in the precise form and arrangement of the parts without departing from the spirit of the invention.

I claim:

1. In a two-speed coaster brake for velocipedes and the like, a fixed axle, a low-speed screw shaft rotatably mounted thereon, a high speed driving member including an oppositely threaded screw shaft rotatably mounted on the low-speed shaft, means for rotating the low-speed shaft from the high speed shaft at reduced speed, an anchor member fixed on the axle, a hub member journalled on the high speed driving member and the anchor member, a high-speed driving clutch member threaded on the high speed screw shaft, a low speed driving clutch member threaded on the low speed screw shaft, a driven clutch member splined in the hub member for alternative engagement with the driving clutch members, a control nut on the low-speed screw shaft, and means including a spring member connecting the control nut to the driven clutch member for shifting the latter into position to engage one or the other of the driving clutch members.

2. A device as set forth in claim 1 in which the spring member is in the form of a compression spring operatively connected to the control nut and the driven clutch member, having a toggle action on said members and movable from a high-speed position in which it tends to maintain the high speed clutch connection operative, through a neutral position to a low speed position in which it tends to maintain the low speed clutch connection operative.

3. A device as set forth in claim 2 in which the high speed driving clutch member and the driven clutch member are provided with interengaging teeth with inclined driving surfaces which are held in engagement by said spring member during high speed operation of the device.

4. A device as set forth in claim 3 in which the high speed clutch teeth are so formed that when a predetermined torque is transmitted therethrough, the driven clutch member is cammed away from the driving clutch member, compressing the spring member until it passes through its neutral position, whereupon it expands and completes the shifting movement of the driven clutch member to its low speed position.

5. A device as set forth in claim 4 including further braking means non-rotatably connected to the anchor member and expansible into frictional engagement with the interior of the hub, and means responsive to backward rotation of the low speed screw shaft for actuating the low speed driving clutch member to engage and operate the brake means.

6. A device as set forth in claim 4 including further means responsive to overrunning of the hub for returning the spring member and the driven clutch member to their high speed positions.

7. A device as set forth in claim 1 in which the spring member is in the form of a dished elastic annulus arranged to reverse its curvature incidental to said shifting movement of the driven clutch member.

8. A device as set forth in claim 7 in which the depth of the high speed clutch teeth is such that when the teeth are cammed apart by a predetermined torque transmitted therethrough, the driven clutch member moves the dished spring member back past its neutral position so that it snaps into its reversely curved shape, thereby completing the shifting movement of the driven clutch member.

No references cited.